Fig. 1

INVENTORS
KARL H. WEBER
FAY T. RYAN
JAMES M. CLARK
BY
Falvey, Souther & Stoltenberg
ATTORNEYS

INVENTORS
KARL H. WEBER
FAY T. RYAN
JAMES M. CLARK
BY
ATTORNEYS

INVENTORS
KARL H. WEBER
FAY T. RYAN
JAMES M. CLARK
BY

*Falvey, Souther & Stoltenberg*
ATTORNEYS

INVENTORS
KARL H. WEBER
FAY T. RYAN
JAMES M. CLARK
BY
ATTORNEYS

INVENTORS
KARL H. WEBER
FAY T. RYAN
JAMES M. CLARK
BY
*Falvey, Souther & Stoltenberg*
ATTORNEYS Aug. 17, 1965   K. H. WEBER ETAL   3,200,475
METHOD OF MAKING A TWO-PIECE FRAME FOR DYNAMO-ELECTRIC MACHINES
Original Filed Nov. 12, 1959   7 Sheets-Sheet 7

INVENTORS
KARL H. WEBER
FAY T. RYAN
JAMES M. CLARK
BY

ATTORNEYS

United States Patent Office 3,200,475
Patented Aug. 17, 1965

3,200,475
METHOD OF MAKING A TWO-PIECE FRAME FOR DYNAMO-ELECTRIC MACHINES
Karl H. Weber, Fay T. Ryan, and James M. Clark, Toledo, Ohio, assignors to Eltra Corporation, a corporation of Ohio
Original application Nov. 12, 1959, Ser. No. 852,488. Divided and this application Jan. 23, 1961, Ser. No. 94,103
4 Claims. (Cl. 29—155.53)

This is a division of Serial No. 852,488, filed November 12, 1959.

This invention relates to the manufacture of a magnetic frame member for a dynamo-electric machine, more particularly to a frame member of the type used for automobile starting motors, generators or the like.

The invention contemplates the provision of a method for producing a two-piece dynamo-electric machine frame member in the mass production line, using conventional production machines with suitable conveyors all adapted to be automatically operated for the purpose of reducing manufacturing costs.

The invention comprehends a system of automatic machines which will effectually carry out a series of operations in sequence so as to transform strip magnetic material into a completed two-piece dynamo-electric machine frame in a mass production line by punching, forming, severing, indexing and assembling two tubular members in concentric relation with apertures in aligned relation.

At the present time, these frame members for dynamo-electric machines are made by two conventional methods which both have undesirable features. The first method fabricates the frame member from strip stock having uniform thickness which is cut to desired length and formed into a tube, the adjoining edges of the strip material being welded together to provide continuity. This method of fabricating the tubular frame member wastes a considerable amount of material inasmuch as the uniform tube thickness was predetermined by the magnetic properties of the frame members so that end portions of the frame member were much thicker than was necessary for mechanical strength.

The second method of manufacturing these dynamo-electric machine frame members also fabricated the member from strip material having uniform thickness in its first phase. This material was cut to suitable length and formed into a tubular conformation which was shorter in dimension but had a greater wall thickness than was required in the final frame member. This tube was then extended by extruding one end to a thin wall conformation by the well known cold extruding process which required tools of great strength and required also mechanical force of great magnitude to bring about the extrusion of the commutator end of the frame member. This method, although it saved material, had the disadvantage that the manufacturing costs were increased by the maintenance required for the tools. In many cases, the extruding dies were made of expensive carbide materials which were subject to excessive wear in the extruding operation, so that it was soon necessary to replace them.

It is, therefore, a principal object of the invention to provide a method of fabricating a dynamo-electric machine frame member, comprising two tubular-shaped members having different wall thicknesses telescoped together in a predetermined relation which may be manufactured more economically in a mass production line operation.

It is a further object of the invention to provide a method wherein two tubular members may be separately formed from strip stock, then assembled together in predetermined concentric relation to provide an integral unit suitable for use as a frame for dynamo-electric machines, the entire operation being continuous and carried out automatically by sequentially-operated automatic machinery incorporated in a mass production line.

It is a further object of the invention to provide a method of making two-piece tubular frame members for dynamo-electric machines which reduces manufacturing costs by combining operations, whereby apertures necessary for final assembly of the dynamo-electric machine are provided in the early fabricating steps in the mass production line while the two elements of the frame member are still in strip form, the punched apertures being aligned when the two fabricated tubular members are telescoped together, by providing a predetermined relation between the two tubular members.

It is a further object of the invention to provide a method of fabricating frame members for dynamo-electric machines consisting of two tubular elements telescoped together in predetermined concentric relation wherein both tubular elements were fabricated from strip stock and formed as the tubular elements, the predetermined concentric relation of the telescope elements aligning apertures in the elements made by punching the original strip stock.

It is a further object of this invention to provide a two-piece frame member suitable for use with both motors and generators for automobiles, which can be fabricated at a very low cost on a mass production line which can be easily adapted to fabricate frames suitable for both motors and generators.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings.

Figure 1:
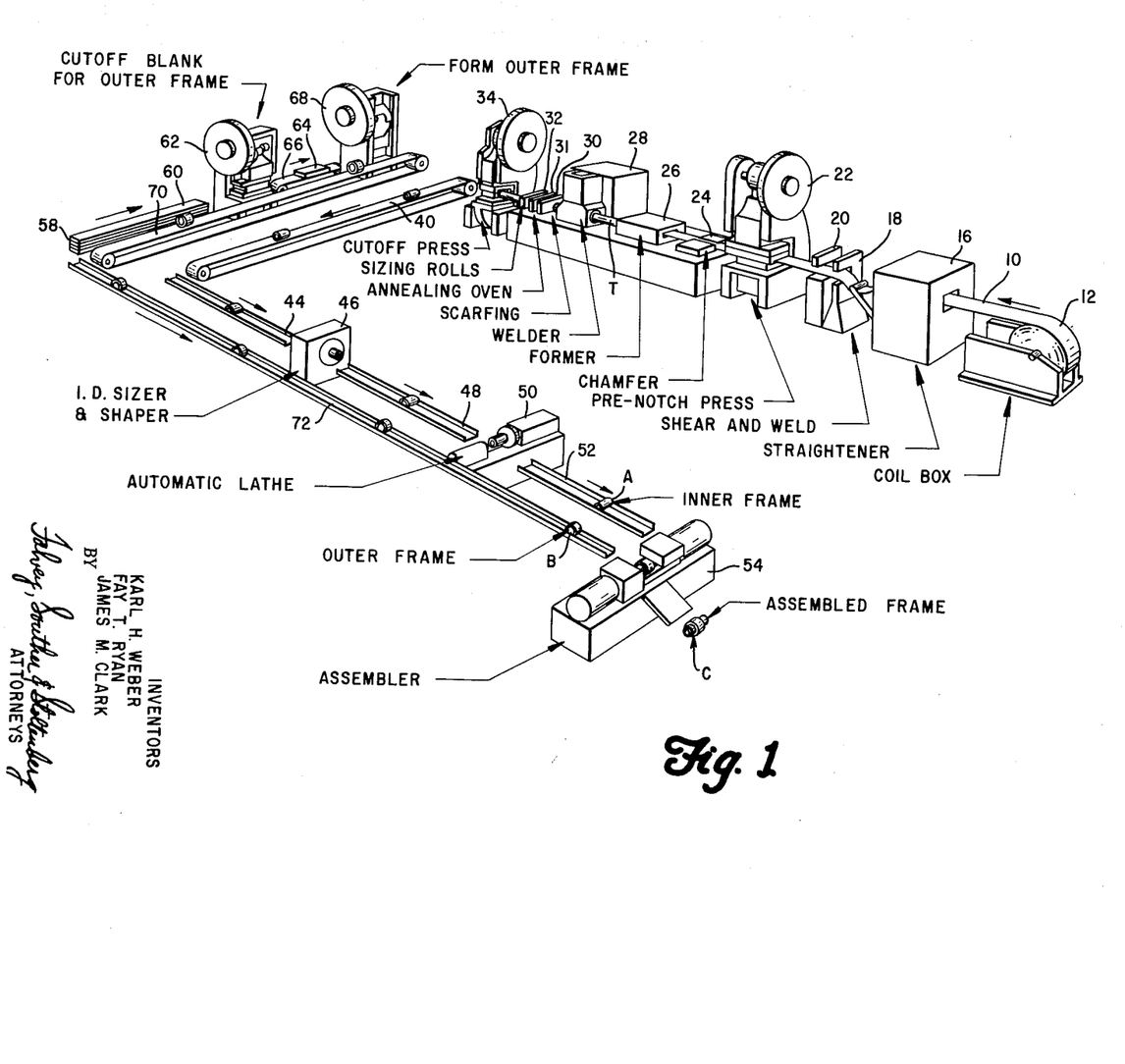
FIG. 1 is a schematic perspective view of a mass production line incorporating the novel method of making the frames for dynamo-electric machines.

Referring now to FIG. 1, a schematic perspective view is shown of a mass production line system which has been developed for the mass production of dynamo-electric machines incorporating the invention comprising various types of automatically-operated machinery interconnected by a feed system including conveyors and chutes. However, it is to be understood that the invention can be produced by various means and is not to be limited to the arrangement, as shown, since any arrangement of the machines or feed system could be developed without departing from the basic concept of the invention.

Figure 6:
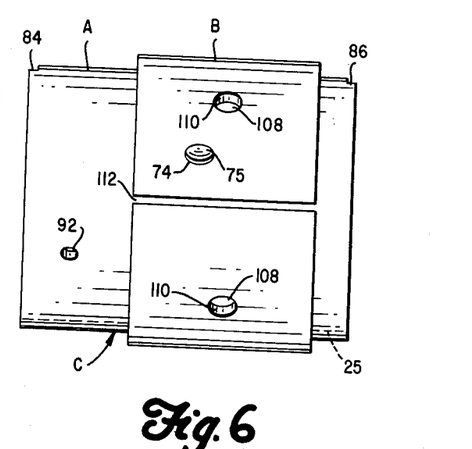
FIG. 6 is a side elevation showing the relationship of two assembled frame members.
Figure 8:
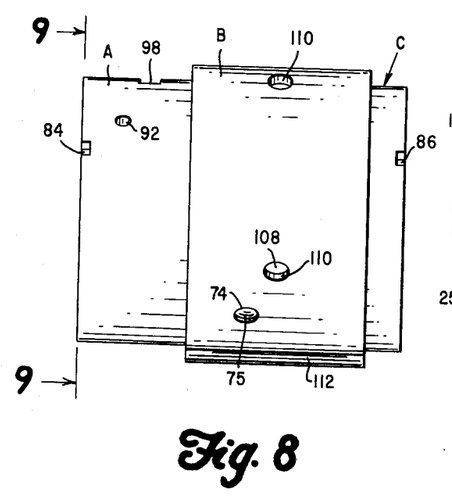
FIG. 8 is a side elevation of the starting motor frame.
Figure 15:
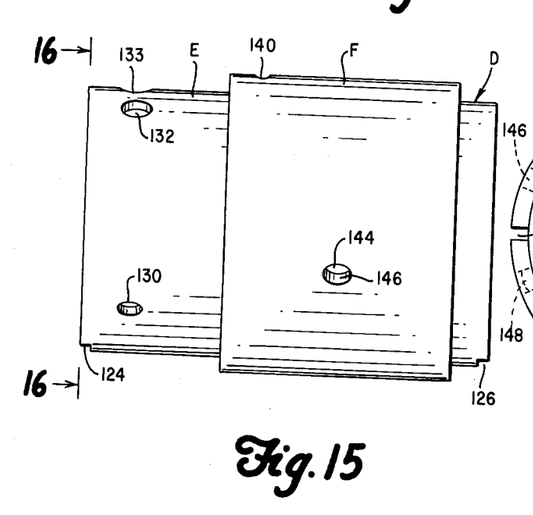
FIG. 15 is a side elevation of the generator frame.
Figure 16:
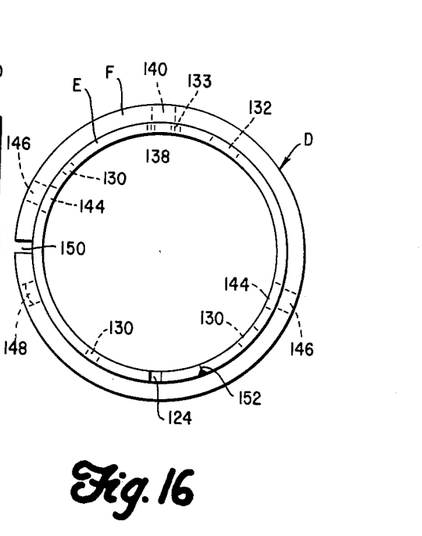
FIG. 16 is a view taken on line 16—16 of FIG. 15 showing an end view of the generator frame.
Figure 17:
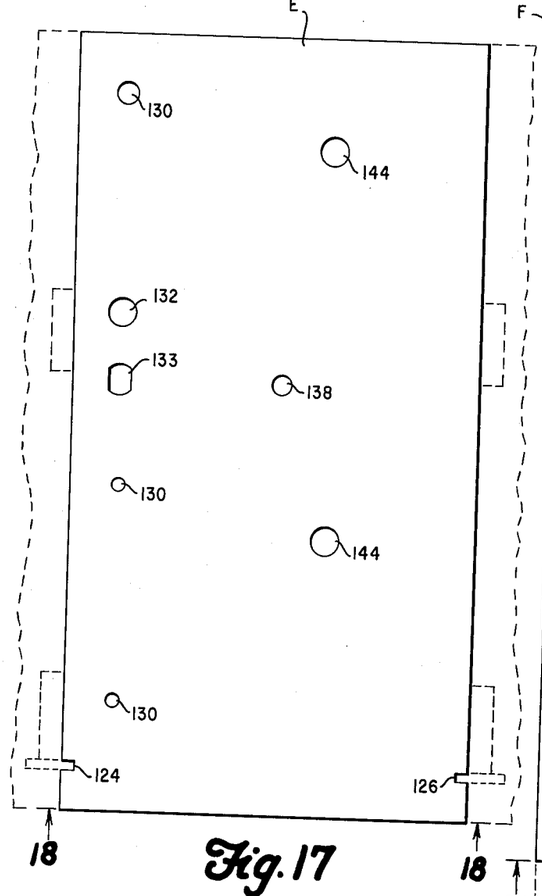
FIG. 17 is a plan view of an unformed inner frame member for the generator.
Figure 18:
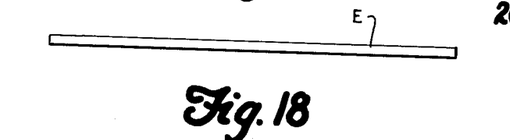
FIG. 18 is a view taken on line 18—18 of FIG. 17.
Figure 19:
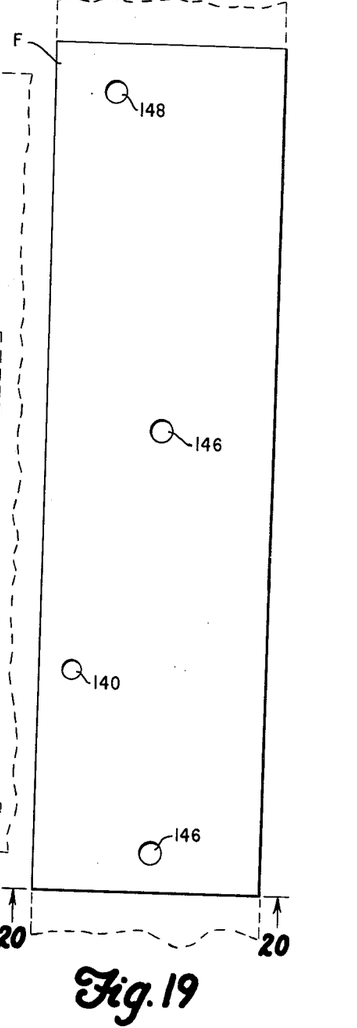
FIG. 19 is a plan view of an unformed outer frame member for the generator.
Figure 20:
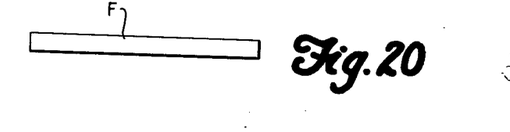
FIG. 20 is a view taken on line 20—20 of FIG. 19.

As can be seen in the drawing, one group of machines produces the inner supporting frame member A while another group of machines produces the outer magnetic member B, both being conveyed to a final assembling machine to provide the two-piece dynamo-electric machine frame C, as shown in FIGS. 6, 8 and 15.

Beginning with the inner supporting frame member A and the first group of machines, a supply of flat strip magnetic metal 10 is provided in coil form 12 to be placed in the coil box 14. The dimensions of the metal strip 10 in the supply coil 12 (i.e. the width and thickness) are predetermined as set forth hereinbefore so as not to have any unnecessary waste after forming the inner frame A or unnecessary material in the finished dynamo-electric machine frame. After the coil 12 has been placed in coil box 14, the free end of the metal strip 10 is threaded through a straightener mechanism 16.

The straightener mechanism 16 eliminates irregularities and curvatures in the strip material when said material was rolled to provide the supply coil 12, so that the strip metal 10 leaves the straightener as a flat sheet and travels through shear and welding stations 18 and 20.

The shear and welding stations 18 and 20 are provided so as to maintain the metal strip 10 in endless form by providing a means for affixing the forward end of a new coil 12 to the back end of a just-finished coil. After coil 12 is unwound and completely used, the back end will be sheared off at shear station 18, providing a perfect ninety-degree cut with relation to the outer longitudinal edges of the metal strip 10. In the meantime, the new supply coil 12 is placed in the coil box 14 and its forward free end is threaded through the straightener mechanism 16 and station 18, and also sheared off to provide another perfect ninety-degree cut. After the shearing step is finished at station 18, the square ends are positioned together at the welding station 20 to be butt-welded and ground flat, thereby providing an endless smooth metal strip. The shearing step provides a means to insure perfect alignment of the two newly-welded strips when traveling through later stations for further forming operations. Any disalignment would affect subsequent operations, so that they would not be performed in proper locations according to predetermined dimensions, and could even cause jamming.

Figure 2:
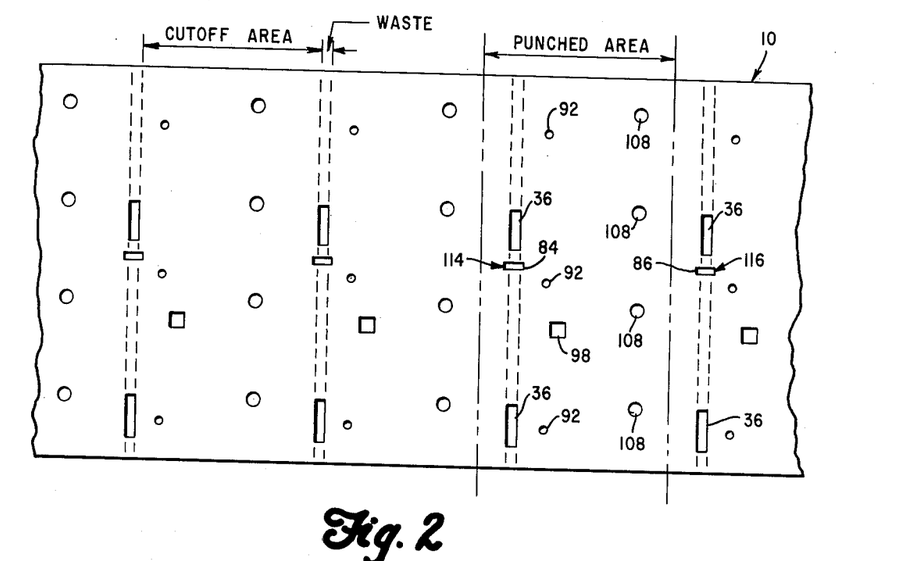
FIG. 2 is a plan view of a portion of a metal strip showing the development of the inner portion of the dynamo-electric machine frame.

After the strip 10 passes the welding station 20 it enters the punch press station 22 which performs the first operation of piercing the inner supporting member A. Referring to FIG. 2, a portion of the strip 10 is shown after passing through the punching station 22, where the press is provided with a sliding die which is indexed by and moves with the strip so as to be automatically operated to punch holes as shown in the continuously moving metal strip 10. All of the holes or apertures required to fabricate a complete dynamo-electric machine are punched at this one time, eliminating any drilling operations, including such additional apertures as are required in subsequent forming stations in the mass production line such as indexing slots and the like. FIG. 2 shows the grouping of the holes punched in the strip 10 in one operation in the "punched area," the details of which will be explained further hereinafter.

From the pre-notch or punch press 22 the strip 10 passes into a chamfer-cutting mechanism 24 which cuts a chamfer on both lower edges of the sides of the metal strip 10. A chamfer is necessary on each side to provide an outwardly-facing V-shaped groove 25 (FIG. 4) after the strip 10 has been rolled-up to form a tube T. The groove 25 provides sufficient surface area for the welding operation of the formed tube as will be described hereinafter. The chamfer is also desirable to provide a clean metal surface for welding at the grooves 25, insuring the uniting of the two edges to form the tube T in the welding process.

Figure 3:
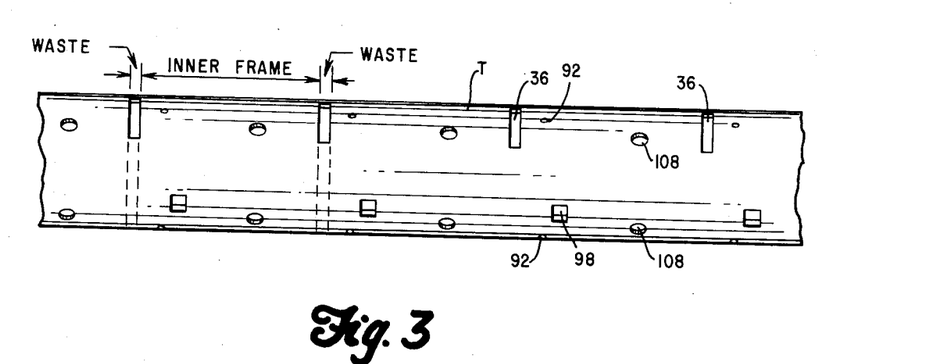
FIG. 3 is an elevational view showing further development of the part shown in FIG. 2.

After the metal strip 10 has been provided with the chamfer by the mechanism 24, it immediately passes into a series of tube-forming rollers at station 26 which roll-up the flat strip 10 into a tube conformation shown in FIG. 3. The tube-forming rollers are of a type found on a conventional tube mill, and are well known in the art, and will not be described in detail. In addition to forming the tube T from the flat strip 10, certain rollers in station 26 are power-driven by a source of power, such as an electric motor (not shown), which, through frictional contact with the strip 10, transmits the power to the strip 10 and tube T necessary to move it continuously through the various stations.

After the strip 10 has been formed into a tube, it passes into a welding station 28 where the open seam tube is welded to form an integral annular metal cylinder with permanently joined edges rolled up from the metal strip 10. A coiled supply of welding material in wire-like form (not shown) is provided on the welding mechanism 28 which is converted, by a high intensity electric current, to molten metal which is deposited in the V-shaped groove 25 to form the welded joint as already described hereinbefore.

In order to insure a sound welded joint at the tube seam, an excessive amount of welded material is deposited which completely fills and overflows groove 25, and results in a slight ridge or bead being formed which extends above the outer surface of the tube T. This is removed in a scarfing operation at station 30. The scarfing operation is accomplished by using a conventional scarfing tool mounted rigidly in a position adjacent the welded seam so as to cut or plane off the excess metal flush with the outer surface of the tube as the tube passes through the station 30. This excess weld metal, deposited during the welding operation, must be removed to provide a smooth clean cylindrical surface free of any projections or imperfections to facilitate telescoping of the inner frame A and the outer frame B when they are assembled.

As a result of the welding and scarfing operation, the localized welded area, including the welding material itself, becomes considerably harder after cooling than the material being welded. Because the tube T, following these operations, comprises areas having different hardness characteristics, an annealing oven 31 is included in the system immediately following the scarfing operation at position 30. The annuealing oven operation reduces the hardness of the welded joint providing the finished tube T with a uniform hardness characteristic. This eliminates any possibility of damage to tools or machinery in further operations on the frame member A such as the frame end finishing operation of the automatic lathe, which will be described further hereinafter. The annealing oven used is of a conventional type adapted to this system and the tube T is cooled in a conventional manner with a continuous flow of a cooling liquid directed on the tube.

Following the annealing operation, the strip now formed as a tube passes through a series of sizing rolls 32 which are conventional in tube mills as they are known in the art. The sizing rolls 32 perform the last operation of the tube mill on the tube T and form it with a perfect cylindrical configuration. FIG. 3 is a side elevation of the tube as it appears after being subjected to the operations already described.

The completely formed and sized tube T now passes into a cutting operation where the tube T is cut into predetermined lengths, depending on the type of dynamo-electric machine being built. The cutting operation is carried out with a conventional press 34 with a sliding die adapted to operate automatically by being controlled by an indexing mechanism cooperating with uniformly spaced apertures in the tube T which determine when the press is to operate. Preparations for the cutoff operation are made during the punching operation by providing rectangular apertures 36 (FIG. 2) in the metal strip 10 to allow entry of a cutoff tool. The apertures 36 are located, so that after the tube T is formed, the apertures will be positioned diametrically opposite from each other in a plane transverse to the tube.

The cutoff operation is performed by a flat, somewhat pointed shear blade (not shown) which initially enters the upper aperture or slot 36 and, by moving in a plane transverse of the tube, contacts the edges of the blade with the slot sides to shear off the waste portions on both sides of the tube (FIG. 3) until the opposite aperture or slot 36 is reached on the other side of the tube to sever the tube portion from the main tube to provide the inner tubular supporting member A for the dynamo-electric machine frame. This method provides a relatively clean cut without any danger of damaging the shear blade which must move with the continuously moving tube during the cutting operation.

After the cutoff operation is completed, the individual inner frame members a fall into a belt-type conveyor 40 which moves them to a chute structure 44, from which they pass by gravity to a sizer and shaper device 46. The conveyor 40 and chute 44 are provided with conventional automatic controls and other means, deemed unnecessary to show or describe, which control the system in the event of a breakdown and/or an overflow of frame members.

The sizer and shaper device 46 provides by an expansion method a means whereby the tubular supporting frame member A is given its final shape and insures that the critical inside diameter of the tubes is uniform which is necessary for subsequent assembling of parts such as pole pieces, armatures and the like of the dynamo-electric machine. This sizing and shaping operation also squares the tube ends with its centerline and removes any slight deformation in the cylindrical conformation of the tubular frame member as a result of the cutoff operation at station 34.

From the sizer and shaper 46, the frame A passes by gravity along another chute 48 to an automatic lathe 50. The automatic lathe 50 dresses both ends of the frame A simultaneously by removing any imperfections or ragged edges as a result of the cutoff operation. At the same time, this operation provides the supporting frame member A with its final longitudinal dimension. The frame member A then passes by gravity to a chute 52 which carries it to an assembling and welding machine 54 where the outer magnetic member B is telescoped on the exterior of the inner supporting frame member A.

Before describing the operation of machine 54, the second group of machines which fabricates the outer magnetic frame member B, will now be described.

The outer magnetic frame member B is fabricated from relatively heavy strip steel 60 which is conveniently placed in a stock pile 58 (FIG. 1), wherein each strip has the required width and thickness for the finished frame C. The thickness of the material for the outer magnetic frame member is approximately twice that of the inner supporting frame member so that it is not feasible to form the outer frame member on a tube mill. The wall thickness of the outer frame gives sufficient rigidity to the formed tube so that it maintains its cylindrical configuration and a seam weld is not required. Only two machines are, therefore, needed to form the magnetic frame member B.

The flat strip metal 60 is manually fed from the stock pile 58 to a cutoff press 62 which performs two functions simultaneously, namely, a blank-cutoff operation and a hole-punching operation. The cutoff operation severs a strip of metal 64 which is the exact length required to form the outer frame B, while the hole-punching operation provides the piece 64 with all of the apertures needed to assemble it into a dynamo-electric machine, including an additional aperture which is used for locating in the assembly and also for welding the members A and B permanently together, which will be described hereinafter.

From machine 62 the blank 64 is conveyed on a belt conveyor 70 and the chute 72, as with the conveyor 40 The forming machine 68 converts the flat steel piece 64 into a cylinder or outer frame member B in three forming steps as is well known in the art.

After being formed, the magnetic outer frame member B is conveyed from the machine 68 on a belt conveyor 70 to a chute 72, on which the frame members pass by gravity down to the assembler 54, already described with reference to the inner member A. The conveyor 70 and the chute 72, as with the conveyor 40 and chutes 44, 48 and 52 for the inner frame member A, are also provided with well known automatic controls and other means which control the system in the event of a breakdown and/or overflow of frame members. The predetermined timing for both the inner frame system and outer frame system is such that a supply of both frame members A and B is always available at the assembler 54.

At the assembler 54 both frame members A and B simultaneously pass into spaced operative position in the machine 54 and each is rotated automatically about its longitudinal axis until a predetermined position is reached, determined by an indexing device, at which time rotation will stop and other controls are automatically operated to actuate air cylinders to telescope the inner supporting frame member A into the outer frame B in a press-fit fashion by relative longitudinal movement. During the fabrication of the outer frame B, it is provided with a slightly smaller inside diameter as compared with the outside diameter of the supporting member A, making possible a relatively tight fit between the two frame members after being assembled.

Figure 4:
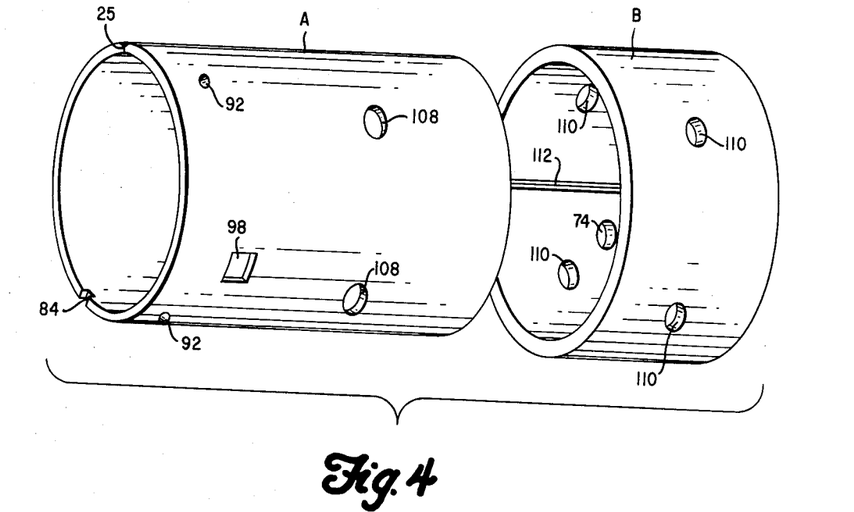
FIG. 4 is a composite isometric view of the inner and outer frame members prior to being assembled.
Figure 5:
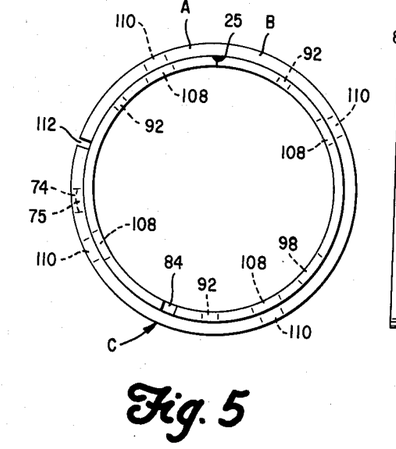
FIG. 5 is an end view showing the relationship of the two assembled frame members.

Following the telescoping together of the two members, additional automatic controls are actuated on machine 54 to initiate the operation of a weld mechanism which deposits a weld bead 75 on the outer exposed surface of the inner member A in aperture 74 (FIG. 6) of the outer frame member B. This weld between the members provides a rigid frame assembly of the two component parts and also insures electrical contact between the two frame members. Other holding means may be provided for this purpose if desired, such as an extrusion of the wall of the inner tube into the aperture in the outer tube. FIGS. 4, 5, and 6 show the relationship of the two frame members before and after the final assembling operation.

FIGS. 1 through 6 disclose the forming and assembling of a dynamo-electric machine frame in general, and more particularly relating to an automobile starting motor frame, the details of which will now be described.

Figure 7:
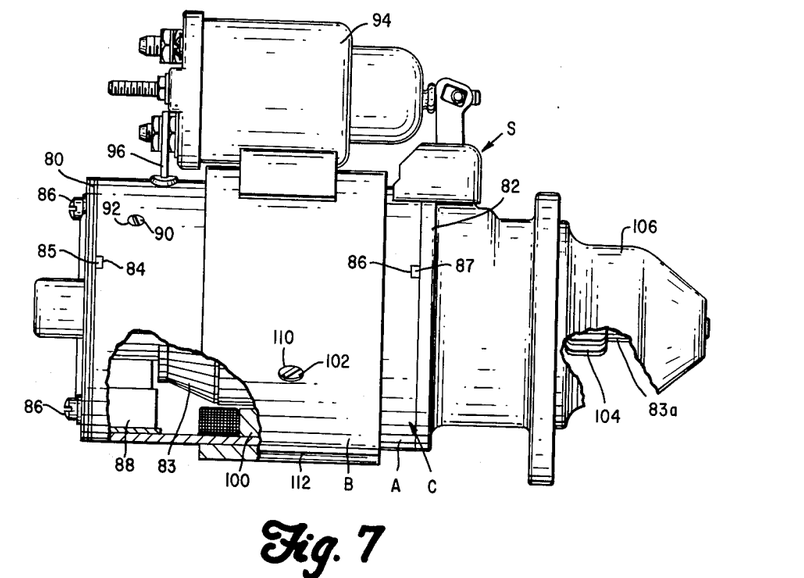
FIG. 7 is an elevational view of an automobile starting motor embodying one modification of the invention.

Referring to FIG. 7, a complete starting motor S is shown including the two-piece frame C. The starting motor S, as seen in the drawing, includes two end heads 80 and 82, which form journal bearings for an armature 83 suspended for rotation on a shaft 83A. The end heads are located and maintained in one position by key slots 84 and 86 which cooperate with projections 85 and 87, respectively, provided on each of the end heads 80 and 82; through-bolts 86 hold the end heads on the frame C. A conventional brushholder mechanism 88 is also provided for the starting motor and is mounted to the frame member by screws 90 projecting through prepunched apertures 92 provided in the inner supporting frame member A.

Figure 9:
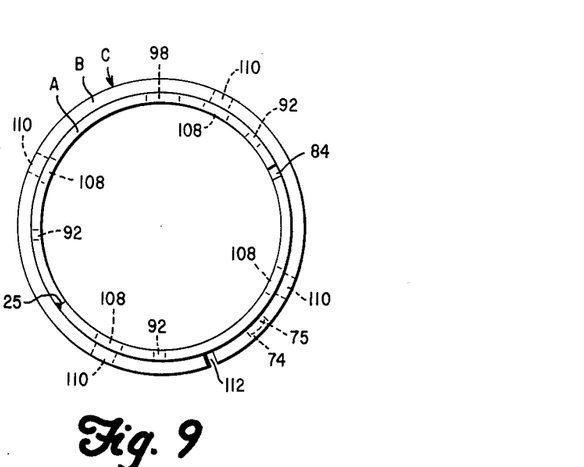
FIG. 9 is a view taken on line 9—9 of FIG. 8 showing an end view of the starting motor frame.

The starting motor S is also provided with a solenoid 94, electrically connected to the motor windings by terminal lead 96, which projects through prepunched aperture 98 (FIGS. 8 and 9). Pole pieces 100 are also provided mounted to frame C by screws 102. A conventional starter pinion 104 and pinion housing 106 are also provided.

With reference to the pole pieces 100 and the apertures for mounting them in the frame C, the inner supporting frame member A is provided with prepunched apertures 108 to be in aligned position, with prepunched apertures 110 provided in the outer magnetic frame member B in the final frame assembly. In the case of a starting motor, four pole pieces are required, therefore, four sets of aligned prepunched apertures are provided, as seen in FIG. 9 in the two members of the assembled frame. The holes in the outer frame member are countersunk before assembly.

The circumferential relationship of the telescoped frame members A and B with their individual apertures and slots, including the welded joint in the supporting inner frame member and the gap 112 in the outer magnetic frame member B, is clearly shown in FIG. 9. The air gap 112 in the outer magnetic frame member does not substantially interfere with the operation of the starting motor, even though the air gap 112 is located between the pole pieces 100. The flux density is relatively low in the case of the starting motor, so that the flux leakage across the gap will give the required density of flux.

Figure 10:
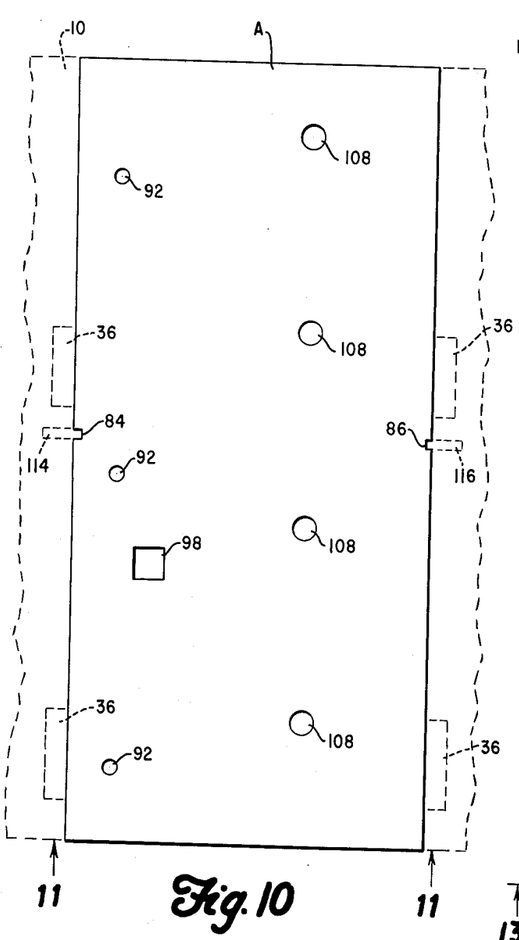
FIG. 10 is a plan view of the inner frame member for the starting motor as it appears before being formed.
Figure 11:
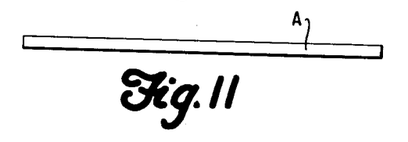
FIG. 11 is a view taken on line 11—11 of FIG. 10.
Figure 12:
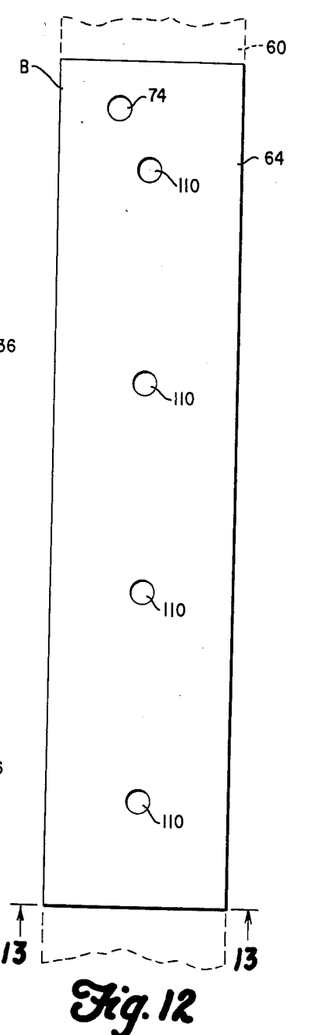
FIG. 12 is a plan view of the outer frame member for the starting motor before being formed.
Figure 13:
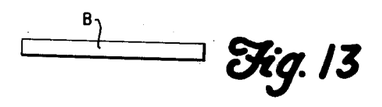
FIG. 13 is a view taken on line 13—13 of FIG. 12.

FIGS. 10 to 13 inclusive disclose in plan view the individual characteristics of the two frame members A and B, including the position of the prepunched apertures and key slots 84 and 86, before the frame members are formed into cylindrical configurations. As can be seen in FIGS. 2 and 10, the slots 84 and 86 are provided by punching elongated rectangular apertures 114 and 116 in strip 10. After the "waste" portion is cut away in the cutoff operation at station 34, the open area remaining of the rectangular holes 114 and 116 provides the slots 84 and 86.

Figure 14:
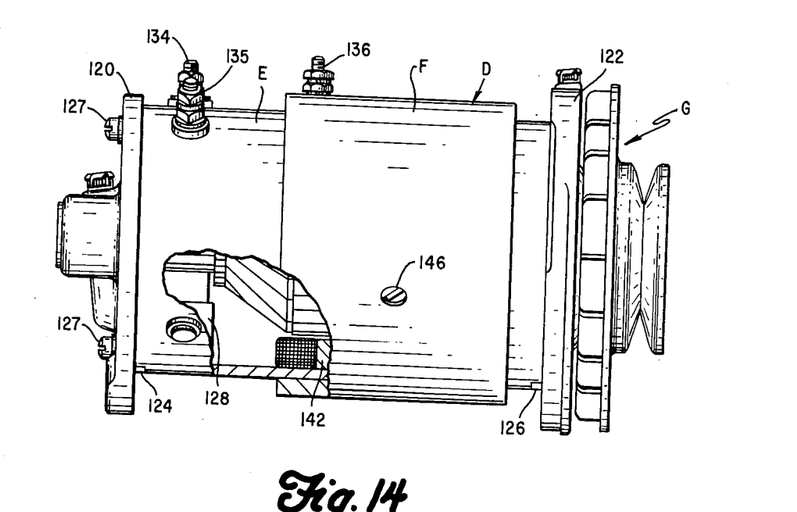
FIG. 14 is an elevation of an automobile generator embodying another modification of the invention.

The invention is applicable to any starting motor frame and can be adapted to a different arrangement of holes or relationship of starting motor components. The invention is also applicable to other forms of dynamo-electric machines, such as an automobile generator G, as shown in FIG. 14.

In FIGS. 14 to 20 inclusive, the invention has been adapted to a finished frame member D for an automotive generator comprising an inner supporting frame member E and an outer magnetic frame member F. The generator components include two conventional end heads 120 and 122 which are held in position with relation to the frame D by detents cooperating with slots 124 and 126 provided in the inner frame E; through-bolts 127 being provided to hold the end heads in position on the two-piece frame member. A brush-holder mechanism 128 is mounted by screws projecting through apertures 130, also provided in the inner frame E. Apertures 132 and 133 are provided in the inner supporting frame member for two terminals 134 and 135, one being an armature terminal and the other a field terminal.

A ground terminal 136 is provided for the generator G to be mounted in aperture 138 in the inner frame member which is in aligned position with aperture 140 in the outer frame member F. The pole pieces 142 are similarly mounted in the frame by screws in apertures 144 in the inner frame member E which are in aligned position with apertures 146 in the outer frame member F. The outer frame member F is also provided with an aperture 148 (FIG. 16), which is used to facilitate a spot-weld and provides a rigid construction in the completed two-piece frame. The air gap 150 (FIG. 16) in the outer frame member F is located at a magnetic neutral so as to be overlapped by the pole piece 142 to maintain the magnetic flux path around the dynamo-electric machine frame. The drawing also shows the seam weld in the V-shaped groove 152 provided in the inner frame member E.

The assembly method and procedure for the two-piece frame D is the same as already described for the starting motor frame C and, therefore, will not be again described in detail. Moreover, it should be noted that the same mass production line system may be used to produce several types and sizes of dynamo-electric machine frames by making minor adjustments or tool changes in the various machines.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. The method of fabricating a two-piece magnetic field member for a dynamo-electric machine consisting of two telescoping concentric tubular magnetic members, including an inner and an outer tubular member, comprising fabricating the inner supporting member from a flat continuous strip of relatively thin magnetic material wherein apertures are punched at predetermined locations, forming the punched flat strip into a tubular conformation, welding the confronting edges of the tubular conformation to form a longitudinal seam, cutting an inner tubular frame member from the tubular conformation of the rolled up strip, expanding the inner diameter of said tubular member to a predetermined dimension, fabricating the outer magnetic tubular member from a relatively thick flat strip of magnetic material having apertures punched therein at predetermined locations, cutting a predetermined length of said thick strip and rolling said severed portion into tubular conformation having a predetermined diameter relative to the inner member with an air gap between the confronting ends to form the outer tubular member, moving the inner and outer members longitudinally together into concentric touching relation to slightly expand the outer member with some of the prepunched apertures in the two members in alignment, and providing holding means in some of the aligned apertures to hold the two members together.

2. The method set forth in claim 1 further characterized by affixing the pole shoes to the inner surface of the inner supporting member by holding means in aligned apertures.

3. The method set forth in claim 1 further characterized by positioning the outer tubular member having a substantially shorter longitudinal dimension substantially centrally of the inner tubular member.

4. The method set forth in claim 1 further characterized by affixing the pole shoes to the inner surface of the inner supporting member to place the air gap in the outer tubular member in a magnetic neutral position with reference to one pole shoe by holding means cooperating with aligned apertures in the two members.

References Cited by the Examiner

UNITED STATES PATENTS

| 669,573 | 3/01 | Bliss | 310—254 |
| 1,931,153 | 10/33 | Mueller | 29—155.53 |
| 1,978,100 | 10/34 | Buerke. | |
| 2,012,889 | 8/35 | McIntyre | 29—477.7 |
| 2,065,368 | 12/36 | Freeze | 29—526 |
| 2,263,714 | 11/41 | Bloomfield et al. | 29—473.7 |
| 2,618,427 | 11/52 | Langley et al. | 29—455 |
| 3,050,832 | 8/62 | Scheldorf. | |

FOREIGN PATENTS 681,233    5/30    France.

WHITMORE A. WILTZ, *Primary Examiner.*

JOHN F. CAMPBELL, *Examiner.*